April 27, 1965 I. M. BRUNTIL ETAL 3,181,045

TUNING VARIABLE CAPACITOR

Filed Jan. 7, 1963 2 Sheets-Sheet 1

INVENTORS:
IRWIN M. BRUNTIL
JONAS M. SHAPIRO
BY Ernest F. Weinberger
Max A. Farmer ATTORNEYS INVENTORS:
IRWIN M. BRUNTIL
JONAS M. SHAPIRO
BY Ernest F. Weinberger
Max D. Garmer ATTORNEYS United States Patent Office 3,181,045

Patented Apr. 27, 1965

3,181,045

TUNING VARIABLE CAPACITOR

Irwin M. Bruntil, Norwalk, and Jonas M. Shapiro, Stamford, Conn., assignors, by mesne assignments, to the United States of America as represented by the Secretary of the Navy Filed Jan. 7, 1963, Ser. No. 249,963
4 Claims. (Cl. 317—249)

This invention relates to the stabilization of crystal frequency oscillations and more particularly to compensation for the frequency deviation of a crystal caused by ageing.

Present day piezoelectric crystals or transducers are of a relatively high order of stability when incorporated into particular oscillator circuits in conjunction with temperature controlled ovens. The order of stability obtainable is on the order of one part in $10^8$ per day. This order of stability, however, will result in a yearly drift of approximately 3.65 cycles which drift, under most conditions, is not objectionable. However, present day technology does in certain instances require an accuracy or stability in excess of that now available.

Considering all the factors that contribute to produce drift in crystals and eliminating those such as temperature, for which compensation has already been applied, there remains basically the factor of crystal ageing. Without delving into a theoretical analysis of ageing, it is clear that by compensating therefor the stability of the crystal oscillation may be increased.

It is therefore an object of this invention to provide a simple, inexpensive, and accurate system for increasing the stability of a crystal.

Another object is to provide automatic frequency compensation for a crystal over an extended period of time in which the crystal ages.

A further object is to provide a capacitor suitable for use in a circuit arrangement for automatically stabilizing the frequency of a crystal over extended periods of time without any need for adjustment.

Other objects and advantages will appear from the following description of an example of the invention, and the novel features will be particularly pointed out in the appended claims.

Figure 1:
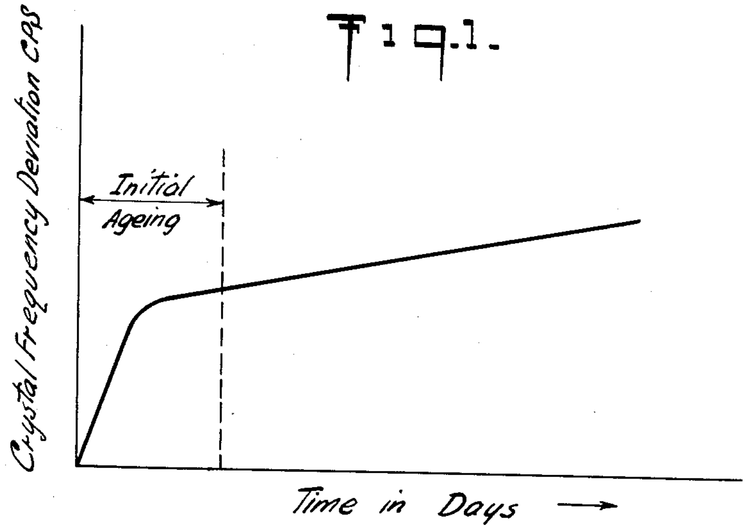
FIG. 1 is a graph showing the frequency deviation of a typical piezoelectric crystal vs. time.

Graphically illustrated by FIG. 1 are the ageing characteristics of a typical piezoelectric crystal. Observation of the curve reveals that the deviation of the crystal with time, in this case days, initially increases at an almost constant rate and then after a period of time still continues to increase but at a reduced or lower constant rate. This deviation is in a direction to increase the resonant frequency of the crystal. Of course, the change in frequency over 365 days is only approximately 3.65 cycles per second and so it is clear that the graph represents a very long period of time with respect to the change in frequency. Clearly in order to minimize this so-called ageing, what would be necessary is to introduce into the circuit of the crystal an equal frequency deviation in an opposite sense and thereby eliminate all the deviation, maintaining the crystal frequency within extremely stabilized limits. On the other hand, one might wish to allow some deviation from the basic crystal resonant point provided that this deviation were kept constant. Stating this in another way, shift the operating crystal frequency. By way of example, if we consider the resonant frequency of the crystal to be initially 1 megacycle, then after one year the frequency will have shifted to 1 mc.+3.65 c.p.s. due to ageing. By applying compensation for the entire period, the frequency could have been shifted to approximately 1 mc.+2 c.p.s. and remained constant for the entire period exclusive of the initial ageing period.

In general, a piezoelectric crystal is normally considered to be equal to a series connected inductor, resistor and capacitor with a shunt capacitor across these series elements. Neglecting for the moment the resistor and shunt capacitor, the crystal will resonate at the frequency for which the two remaining components have equal and opposite impedances. If there is introduced in series with the crystal another component either inductive or capacitive, this resonant frequency will be shifted by an amount dependent on the impedance value of the added component.

Figure 2:
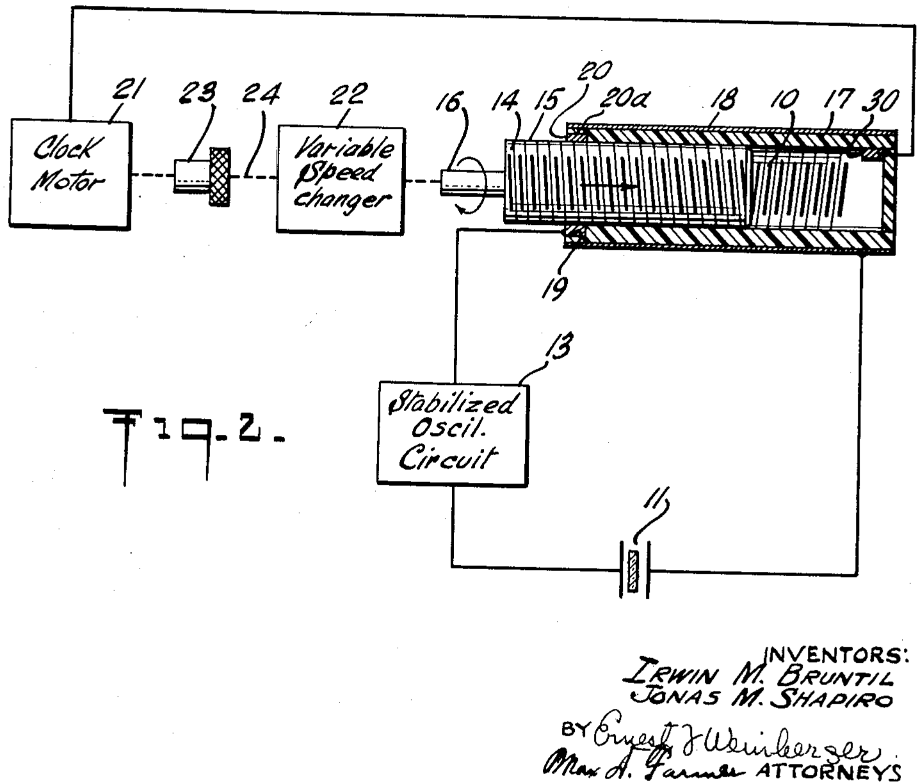
FIG. 2 is a view, part in block and part in perspective, of an embodiment made in accordance with this invention.

By providing this added component with a variable adjustment, the operating frequency of the crystal may be altered. Since the variation in frequency contributed by this component is varied with respect to time, it is desirable that its contributed frequency deviation be a linear function with time and that this deviation be small. Such an arrangement is illustrated in FIG. 2 where a piston type trimmer capacitor 10 has its capacitance connected in series with a piezoelectric crystal 11 and an oscillator circuit 13 with which it is associated. The crystal controls the frequency of the oscillator circuit and therefore any variations in the crystal parameters are reflected in the stabilized oscillator frequency. The capacitor which is shown in cross-section is provided with a cylindrical metallic piston 14 whose outer surface 15 is threaded and which may be of either a solid or hollow construction. The piston is threaded into the body of the capacitor by the rotation of its extension or shaft 16. The body of the capacitor has a hollow dielectric cylinder 17 on whose outer surface is coated a metallic layer 18 or in the alternative a coaxial metallic cylinder substituted for the coating. An annular recess 19 at one end of the dielectric cylinder confines therein an internally threaded bushing 20 whose threads mate with those of the piston and which is prevented from rotating therein by a radial pin 20*a*. The recess does not extend outwardly beyond the dielectric and there exists a portion of the dielectric between the bushing 20 and the coating 18 so that where a metallic bushing is employed it will be electrically connected to the coating. The piston 14 and the coating 18 define the plates of the capacitor whose capacitance is dependent on the magnitude of the opposed surface areas of the piston and coating. As the shaft 16 is turned the piston either enters or is withdrawn from the body of the capacitor and thereby alters the area of the piston exposed to the other plate. External connections are made directly to the coating 20 and the piston either by slip rings (not shown) or through the metallic bushing within which the piston is threaded.

Observing the graph of FIGURE 1, it is clear that initially as the crystal ages the frequency deviation increases at a rapid rate and then decreases its rate of increase to almost a linear value. Due to the difficulties in compensating for this initial period of ageing, the crystal is allowed to age without compensation while its frequency deviation is monitored until its rate becomes almost linear. The ageing process of a crystal is always conducted under actual electrically operating conditions and varies in time from one week to a month depending on the particular crystal.

The arrangement of FIGURE 2 illustrates in addition to the capacitor 10 one possible grouping of components for accomplishing compensation over a long extended period. A clock motor 21 drives a variable speed changer 22 through a disconnect coupling 23 by way of shaft 24. The shaft 16 of the capacitor is affixed to the output of the speed changer which in this case is operating to reduce the speed of rotation. By way of example, if the threaded portion of the capacitor has 36 threads per inch and is one inch long, then it requires 36 turns of its shaft to transverse its entire capacitive range. Clock motors are available in a multitude of ranges and by selecting one having a rate of say, one revolution per day, then a variable speed changer having a ratio range from 1:1 to 25:1 would allow for a total running operation from approximately 36 days to 900 days which is well within the ranges contemplated by this invention. One type of changer, although many are readily available, is that manufactured by the Metron Instrument Co. of Littleton, Colorado, and described in their literature as their Series 2.

Figure 3:
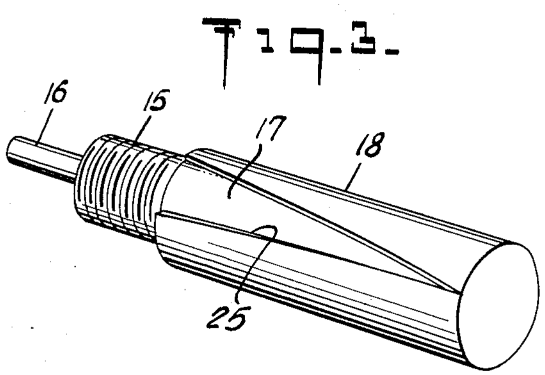
FIG. 3 is a perspective view of a capacitor used in the illustrated embodiment of FIG. 2.
Figure 4:
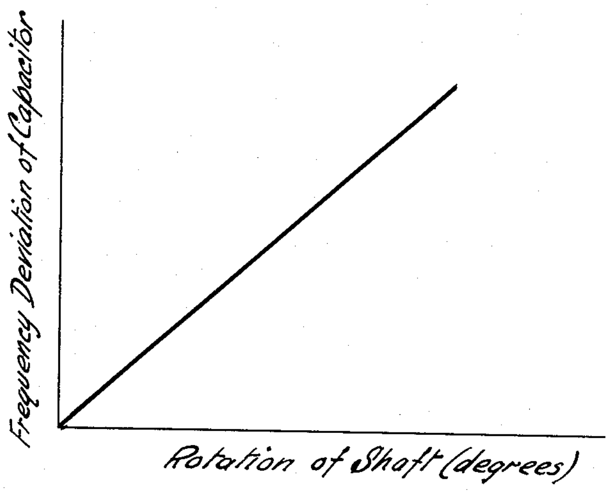
FIG. 4 is a graph illustrating the relation between frequency deviation and shaft rotation for the capacitor of FIG. 2.

The capacitance of a piston capacitor when plotted against shaft rotation defines an approximately straight line but when the frequency deviation is plotted against rotation the curve is no longer a straight line. By removing a portion of one of the capacitor plates as for example, from the coating 18, the relationship between the frequency deviation and shaft rotation can be altered depending on the particular geometrical pattern of the removed coating portion. As illustrated in FIGURE 3 an approximately wedge or triangular shaped portion 25 of the coating has been removed with its lengthwise dimension being along the axis of the capacitor body. With this portion removed, the plot of frequency deviation versus rotation approximates a straight line and by actually mathematically calculating the exact configuration or by removing a section at a time as the piston is advanced through the capacitor body while measuring its frequency deviation, a rather exact straight line relationship can be obtained as shown in FIGURE 4. In this case (exactly straight-line relationship) the edges of the wedge trace a hyperbolic function. If one were to plot frequency deviation against time (constant rate of shaft rotation), this would also define a proportional relationship or a straight line. In this case, however, the slope or inclination could be altered depending on the speed of rotation so that any rate of frequency deviation could be selected by merely choosing the proper speed of rotation.

As was seen from FIGURE 1, the crystal frequency deviation increases in a positive sense with time (ageing). Thus, in order to stabilize the crystal frequency, it is necessary to decrease its resonant frequency. By adding to the crystal circuit a capacitance that increases with time or in effect a frequency deviation increasing in a negative sense (decreasing in frequency) compensation will occur. This increasing capacitance and linear frequency deviation is attained by merely moving (rotating) the piston into the capacitor of FIGURE 3.

A proper understanding of the invention can be more easily obtained by outlining the operation of the illustrated embodiment physically described above. In general, the frequency characteristics of most crystals follow or approximate those of FIGURE 1, except that the knee and the slope of the curve vary to some extent. Therefore, by placing the crystal for which compensation is desired in the circuit arrangement under which it will be operated and actively operating the crystal, it will age in accordance with its characteristics. The frequency of oscillation is continually monitored and a curve similar to that of FIGURE 1 is plotted. After the curve attains an almost uniform slope (some point in time after it has reached the knee), it has been initially aged and the capacitor 10 which has been in the circuit but inactive is activated by applying the output of the clock motor 21 to the speed changer 22 through the coupling 23. The speed changer is adjusted to drive the piston capacitor at such a rate as to set the slope, of a curve of a plot similar to FIGURE 4, equal to and in an opposite sense to that of the crystal curve obtained by monitoring. Generally, however, this is set to slightly under-compensate since the crystal frequency deviation, although increasing at an almost uniform rate, does decrease in rate after an extended time period and by initial under-compensation the overall results are more exacting. Thus, by way of example, if we were compensating a CR27U AT cut crystal we would find that after the preageing or initial ageing, its deviation will be approximately one part in $10^8$ per day. The variable speed changer is then set to give us a capacitor under-compensation of approximately 5 parts in $10^9$ per day, so that midway in the first six months period the compensation would be precisely correct. Thus, if at the end of six months compensation, the capacitor has traversed its entire range, it is possible to add into the circuit a fixed capacitance equal in value to that of the piston capacitor and recycle the entire device or system. For this purpose a stop or end of travel micro switch generally designated at 30 of FIGURE 2 has been inserted and electrically connected to the clock motor to stop it. Since after this extended period (possibly in excess of one year), the crystal deviation may have changed somewhat from that observed initially after the first six months, the variable speed changer is again reset for the necessary compensation. In this regard both continuously variable speed changers are readily available but it has been found that in view of the lengthy time intervals involved equally satisfactory results (compensation) have been achieved through the use of interchangeable gear systems.

It will be understood that various changes in the details, materials and arrangements of parts and steps, which have been herein described and illustrated in order to explain the nature of the invention, may be made by those skilled in the art within the principle and scope of the invention as expressed in the appended claims.

We claim:

1. A piston capacitor comprising:

a hollow dielectric cylinder having an electrically conducting metallic coating on its entire outer surface, and provided with lengthwise internal threads, and an annular internal recess at one end thereof, said coating being coextensive therewith except for a single generally wedge-shaped portion extending lengthwise of said cylinder, an internally threaded bushing fixedly disposed across one end of and confined entirely within said recess of said cylinder, an externally threaded cylindrical metallic electrode whose threads mate with the internal threads of said bushing disposed coaxially for telescoping within said electric cylinder, whereby when said metallic electrode is threaded into said bushing and rotated, the capacitance between said metallic coating and said metallic electrode will be altered so that the amount of rotation of said electrode and the frequency deviation of a tuned circuit within which said capacitance is introduced are related by a constant proportion.

2. The capacitor according to claim 1, wherein said metallic electrode is solid and has an axially extending shaft.

3. The capacitor according to claim 2, wherein the apex of said portion is disposed proximate said bushing and the base of said portion is proximate the opposite end of said dielectric cylinder.

4. The capacitor according to claim 3, wherein said portion is in the shape of an isosceles triangle.

References Cited by the Examiner

UNITED STATES PATENTS

| | | | |
|---|---|---|---|
| 2,504,758 | 4/50 | Thias | 317—249 |
| 2,575,199 | 11/51 | Stutt | 317—249 |
| 2,607,826 | 8/52 | Barnes | 317—249 |
| 2,768,338 | 10/56 | Williams et al. | 317—249 |

| | | | |
|---|---|---|---|
| 2,774,017 | 12/56 | Shapp | 317—249 |
| 3,029,356 | 4/62 | Renaut | 310—8.1 |
| 3,071,742 | 1/63 | Bang | 317—251 X |
| 3,075,097 | 1/63 | Scarpa | 310—8.1 |

FOREIGN PATENTS

| | | |
|---|---|---|
| 458,710 | 12/36 | Great Britain. |

JOHN F. BURNS, *Primary Examiner.*

MILTON O. HIRSHFIELD, *Examiner.*